(12) United States Patent
Bomann

(10) Patent No.: US 6,393,757 B2
(45) Date of Patent: *May 28, 2002

(54) FLESH-LIKE JACKET FOR FISHING LURES

(76) Inventor: Christopher Atkins Bomann, 6934 Bevis Ave., Van Nuys, CA (US) 91405

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/465,778

(22) Filed: Nov. 12, 1998

Related U.S. Application Data

(63) Continuation-in-part of application No. 08/769,063, filed on Dec. 18, 1996, now abandoned.
(60) Provisional application No. 60/008,944, filed on Dec. 20, 1995.

(51) Int. Cl.[7] ............................................. A01K 85/00
(52) U.S. Cl. ..................................... 43/42.09; 43/42.24
(58) Field of Search ............................. 43/42.09, 42.06, 43/42.29, 42.37, 42.38, 42.24, 42.35, 42.33

(56) References Cited

U.S. PATENT DOCUMENTS

| | | | | | |
|---|---|---|---|---|---|
| 2,172,889 A | * | 9/1939 | Niemi | ........................ | 43/42.35 |
| 2,745,206 A | * | 5/1956 | Gaw | ........................ | 43/42.06 |
| 2,776,518 A | * | 1/1957 | Felmlee | ........................ | 43/42.24 |
| 2,797,519 A | * | 7/1957 | Keller | ........................ | 43/42.06 |
| 2,994,982 A | * | 8/1961 | Murawski | ........................ | 43/35 |
| 3,965,606 A | * | 6/1976 | Bingler | ........................ | 43/42.24 |
| 4,492,054 A | * | 1/1985 | Barnhart | ........................ | 43/42.23 |
| 4,791,749 A | * | 12/1988 | Stazo | ........................ | 43/42.29 |
| 4,887,377 A | * | 12/1989 | Morris | ........................ | 43/42.24 |
| 5,070,639 A | * | 12/1991 | Pippert | ........................ | 43/42.31 |
| 5,829,183 A | * | 11/1998 | Guerin | ........................ | 43/42.35 |
| 5,946,848 A | | 9/1999 | Ysteboe et al. | | |

* cited by examiner

*Primary Examiner*—Kurt Rowan
(74) *Attorney, Agent, or Firm*—Craig E. Shinners

(57) ABSTRACT

The present invention discloses a combination fishing lure comprising a common crankbait and jacket. The removable jacket is a highly elastic covering molded into a seamless, elongated shell that is stretchable over the crankbait. The thickness of the jacket provides a natural flesh-like texture to wood, hard plastic or metal crankbaits while protecting the crankbait from scratches caused by fish strikes or by collision with other objects.

The jacket has a cavity with at least a first opening providing access to the cavity. The crankbait is removably positioned in the cavity of the jacket by stretching the jacket in the region surrounding the opening until it is large enough to insert the crankbait. The jacket may include a rearwardly projecting tail portion that changes the appearance of the crankbait by increasing the overall length of the crankbait and that moderates the erratic wobble of the crankbait creating a realistic undulating swimming action.

8 Claims, 6 Drawing Sheets

FLESH-LIKE JACKET FOR FISHING LURES

This application is a continuation in part of U.S. patent application Ser. No. 08/769,063 filed Dec. 18, 1996, now abandoned.

This application claims the benefit of U.S. Provisional Application No. 60/008,944 filed Dec. 20, 1995.

BACKGROUND OF THE INVENTION

The present invention relates to fishing lures. More particularly, the present invention relates to a flesh-like jacket for encasing and enhancing the action of a crankbait fishing lure.

Fishing is an activity enjoyed by many as a recreational sport or as commercial enterprise. Sport fisherman or recreational anglers still use the time-proven method of dropping a baited hook attached to a piece of line into the water in the hopes of catching a fish. Through modern advances, anglers now have a wide assortment of equipment with which to find and catch fish.

To encourage the fish to bite, the hook may be baited with a tempting morsel of food such as a live bait fish, live worms, roe or other live bait that is part of the natural diet of the fish species sought by the angler. Anglers also may use a fishing lure which is a manufactured artificial bait that mimicks the look and action of the natural bait. Although the dietary choices of most fish can be extremely fickle, part of the attraction of fishing is attempting to discern not only where the fish are located but also the type of bait that the fish are interested in eating. When bait fish are not available to the angler or its use forbidden due to local laws restricting such use, anglers often use fishing lures to catch fish. Fishing lures are used by anglers in both salt water and fresh water.

There is a large variety of soft plastic lures typically made from plastisol and molded into the shape of, by way of example, worms, grubs or similar such shapes. The plastic material may be impregnated with salt or other scents so that the taste of the lure is similar to natural bait. Soft plastic lures are threaded onto a hook, attached to a fishing line and cast out and retrieved or bounced along the bottom to mimic a worm swimming in the water. Although very effective as a bait, fish often inhale soft plastic lures and become internally hooked. Since many anglers practice "catch and release," it is undesirable to internally hook the fish because such fish often die due to the internal hook set.

In addition to soft plastic lures, other lures, often referred to as "crankbaits" are commonly used. Crankbaits are hard-bodied fishing lures attached to the fishing line, cast out onto the water and then cranked or reeled in by the angler. The motion of the crankbait through the water causes the crankbait to dive beneath the surface of the water or, alternatively, create a disturbance on the surface of the water that mimics an injured minnow or a fleeing fish. When a fish attacks a crankbait it is often hooked in the lip thereby facilitating its subsequent release.

FIG. 1 illustrates a typical prior art crankbait 10 which may be manufactured from wood, metal or hard plastic (such as poly-carbonate plastic) and coated with several layers of colorful finish paint or decals to attract fish by mimicking the coloration of a bait fish. Alternatively, the body may be painted in a color, such as metallic, or brightened by embedding reflective facets (not shown) in a polyurethane coating so that the crankbait is bright and readily discernible in murky water or low light conditions or is otherwise enticing to fish. The finish layers often include painted representations for eyes 12, fins 14, scales 16 or gills 18 so as to emulate a natural appearance of common bait fish. It will be appreciated that such features may be duplicated on the side of crankbait 10 not shown in FIG. 1.

Crankbait 10 may have a diving bill 20 that extends outward and in some cases downward from the head portion of crankbait 10. A fishing line attachment loop 22 is shown as a part of the diving bill although attachment loop 22 may be located on crankbait 10 in the area generally defined as between the diving bill 20 and the top of the head portion above eye 12. Diving bill 20 may vary in size with a smaller surface area causing the crankbait 10 to dive to a relatively shallow depth and larger surface area for deeper diving crankbaits. The angle of attachment of diving bill 20 may also vary respect to the longitudinal axis 24 of crankbait 10 with a larger angle resulting in a faster diving crankbait. A fixed, solid dorsal fin 26 is shown extending above the body of crankbait 10 in FIG. 1 although many crankbaits do not have any such protruding features.

Although not shown, crankbait 10 may have a variety of configurations. For example, the forward-most head portion could be flattened or concave (to represent a bait fish swimming with an open mouth) rather than the generally convex shape as shown in FIG. 1. In such configurations, diving bill 20 is omitted since such crankbaits are intended to be fished on the surface of the water. In other configurations, diving bill 20 is attached to the head portion of crankbait 10 below axis 24.

With so much diversity in size, color and shape designed to appeal to one or more species or size of fish, anglers often carry a large number of crankbaits in their tackle boxes. Notwithstanding the diversity, individual anglers will often develop a preference for a preferred crankbait that, they believe, has a high probability of catching fish. Popular freshwater crankbaits are manufactured by Rapala of Väaksy, Finland and by Mirrolure of Largo, Fla. as well as by many other companies throughout the world.

Colorful streamers, noise makers or other novelties can be attached to the crankbait or to the fish line in an attempt to make the crankbaits more attractive to the fish. For example, a propeller (not shown) may be rotatably mounted to the head portion or rear portion of crankbait 10 to create turbulence as the crankbait is pulled through the water. One such crankbait is manufactured by Fred Arbogast and available from Bass Pro Shops located in Springfield, Mo. In still other configurations, crankbait 10 may have a jointed body where a separate rear portion is coupled to the body portion of crankbait 10 by interlocking loops or may have a segmented body such as disclosed in U.S. Pat. No. 5,182,875, issued to Righetti.

It is believed that common attributes of a successful crankbait is its coloration, size, appearance and swimming action. With respect to the coloration of a crankbait, one skilled in the art will appreciate that with use, the decals or the painted design of a crankbait often become scratched from collisions with other items in the angler's tackle box, with items under water such as rocks, submerged logs or other such debris or from repeated strikes by fish attracted by the crankbait. The brightness of the painted design may also fade after extended use in water and exposure to sunlight. With continued use, such crankbaits may tend to lose their effectiveness resulting in fewer and fewer strikes over a given period of time because fish tend to avoid crankbaits that appear unattractive or unappealing as food. It is preferable to refurbish a popular crankbait by enhancing the attractiveness of the crankbait rather than abandon its use.

At times, it may be desirable to change the appearance of the crankbait by changing the coloration or adding decorative features. If an angler were fishing with a crankbait painted to look like a sardine but the game-fish are feeding on anchovies, the sardine crankbait would likely be largely ignored and the number of strikes could be few or nonexistent. Thus, the angler may have to remove the sardine crankbait and replace it with a crankbait having the coloration suggestive of an anchovy to increase the number of strikes. However, replacing one crankbait with another similar crankbait differing only in the coloration requires duplication in the number of crankbaits. It would be cheaper, if the angler could reduce the number and variety of crankbaits that must be carried while maintaining the flexibility to quickly and easily change the coloration of the crankbait to match the desired bait fish.

At still other times the water conditions may make it difficult for fish to locate bait because of, for example, darkness or murky water conditions. When this occurs, anglers may need to fish with a crankbait that has a metallic or shiny finish or that is fluorescent so as to increase visibility of the crankbait in the water. However, it would again be cheaper if the angler could adapt a single crankbait to compensate for the conditions with a bright shiny finish.

At still other times, even if the proper coloration of the crankbait is selected, fish will often fail to strike at even the most productive of the angler's crankbaits. In such instances, the angler may be tempted to try larger or smaller crankbaits to determine what size of bait attracts the fish. To change from, for example, a small anchovy to a larger anchovy, the angler would have to remove the anchovy crankbait and replace it with another similar but larger crankbait. This change requires the angler to further maintain a stock of crankbaits that have a similar body designs but that differ in size. Clearly, it would be to the advantage of the angler to have the ability to quickly and inexpensively change a single crankbait so as to make it appear to the fish as a larger (and, hopefully, more desirable) bait fish or conversely, a smaller bait. Alternatively, it may be desirable to add features to a crankbait such as protruding fins, tails, scales or other anatomical features to make the crankbait appear more life-like. An example of prior art attempts to change the appearance of a crankbait is disclosed by U.S. Pat. No. 5,333,406, issued to Wylie in which a cloth covering changes the coloration of the lure.

With respect to the swimming action of a crankbait, it is desirable for action of the crankbait to closely mimic the undulating side-to-side motion of a natural bait fish. However, most crankbaits have an erratic side-to-side action or wobble significantly different from the natural motion of a bait fish. Accordingly, it is desirable to modify the motion of a crankbait such that it has a fluid, undulating side-to-side motion of a bait fish as it is cranked in by the angler.

Another problem that arises with many crankbaits is that even though the body design closely duplicates the natural bait which the crankbait is intended to replace, fish often hit the bait but do not strike to the degree necessary to permit the angler to set the hook and catch the fish. One reason for this is that fish have sensitive mouths and are able to discern that the texture of the crankbait is hard and unfamiliar. Having tasted the bait, fish lose interest and move on to seek other bait. It would be to the angler's benefit to present a lure that has both the swimming action of a crankbait as well as the texture and taste of a soft plastic lure that more closely simulates fish flesh than does a wood, metal or hard plastic crankbait or a crankbait having a cloth covering.

SUMMARY OF THE INVENTION

To overcome the limitations associated with prior art crankbaits described above, and to overcome other limitations that will become apparent upon reading and understanding this specification, the present invention discloses a combination of a common crankbait such as is found in the tackle box of every angler and a jacket or skin that covers the crankbait. In one preferred embodiment, the jacket comprises a highly elastic covering molded into a seamless, elongated shell with a rearwardly projecting tail portion, which may include a caudal fin, that is stretchable over a crankbait. The thickness of the jacket provides a natural flesh-like texture to wood, hard plastic or metal crankbaits while protecting the crankbait from scratches caused by fish strikes or by collision with other objects.

For purposes of illustration the following description describes the present invention as used with conventional prior-art crankbaits which have a generally fish-like appearance with a head and a rear portion separated by a body portion. Treble hooks are attached at one or, in most instances, two or more hook attachment points one of which is usually positioned on the rear portion of the crankbait. Additional hooks may be attached proximate to the head portion of the crankbait or, if the crankbait is of sufficient size, to the body portion of the crankbait midway between the head and rear portions. Some crankbaits may have a diving bill attached to the forward end of the head portion so that the crankbait will dive beneath the surface of the water when moving through the water.

The jacket has a cavity with at least a first opening providing access to the cavity. The crankbait is removably positioned in the cavity of the jacket by stretching the jacket in the region surrounding the opening until it is large enough to insert the crankbait into the cavity. Insertion is simplified by first rolling the jacket into a minimized configuration prior to stretching the jacket and unrolling the stretched jacket over the crankbait.

Once the crankbait is encased within the jacket, the hooks project through "slits" in the jacket which can be made using a sharp knife or by forcing the hook attachment loop through the jacket material If the crankbait has a diving bill, it preferably projects through the opening. Due to the tear resistant nature of the jacket, the opening or slits will not further significantly tear even if the jacket is removed and applied to a much larger crankbait.

The shape of cavity is generally elliptical with a girth dimension that is preferably smaller than the corresponding girth dimension of the crankbait. The length of the cavity is preferably about equal to or less than the length of the crankbait although the length of the cavity may be substantially greater without noticeable negative effects. With the elastic material of the jacket, the cavity is stretched until the cavity's dimensions substantially equal the dimensions of the crankbait so that the jacket tightly clings to the body of the crankbait. When the jacket is applied to a crankbait, the overall length of the crankbait is extended by the jacket's tail portion which extends rearward. The tail portion of the jacket changes the appearance of the crankbait by increasing the length and by adding a realistic looking fish-tail or a trailing skirt of colorful material. The tail portion also acts as a rudder that tends to moderate the erratic wobble of a crankbait thereby creating a very realistic undulating swimming action of a natural bait fish.

The jacket in one preferred embodiment is substantially clear or amber in color. With a clear jacket the coloration and shape of the crankbait may readily be perceived by the fish. Highlights, such as reflective particles or dye, may be added to the tail portion of a clear jacket to provide definition to the otherwise transparent tail. Amber jackets may be used to present a brightly colored lure with a slightly faded appearance or to provide a more visible tail section. Bright or reflective particles may be added to the jacket during manufacture so as to enhance the original coloration of the crankbait. Alternatively, the jacket may be dyed so that the perceived color of the lure is changed.

The jacket may also have a textured outer surface to represent scales as well as protruding elements representing fins and gills. When the jacketed crankbait is allowed to float in the water, the protruding fins will flutter outward giving the appearance of a suspending fish but will fold back against the crankbait as it is retrieved.

In yet another embodiment, the jacket may include one or more cavities into which scent attractant, such as fish blood, cricket legs, worm parts or commercial fish food may be inserted. Slits or openings in jacket provide access to the cavities so that the jacketed crankbait emits the attractant as it is retrieved.

Together with the flesh-like texture of the material, the jacket of the present invention makes it possible to provide a hard bodied crankbait with the texture appearance, smell and swimming action of a natural bait fish.

DETAILED DESCRIPTION OF THE INVENTION

In the following description of one preferred embodiment, reference is made to the accompanying drawings which form a part hereof, and in which is shown by way of illustration a specific embodiment in which the invention may be practiced. It is to be understood that other embodiments may be utilized and that changes may be made without departing from the scope of the present invention. For purposes of illustration the following description describes the present invention as used with conventional prior-art crankbaits that have a generally fish-like appearance. However, it is contemplated that the present invention can be used in conjunction with other baits such as jerk baits, spoons, jigs or as a soft bait.

Figure 1:
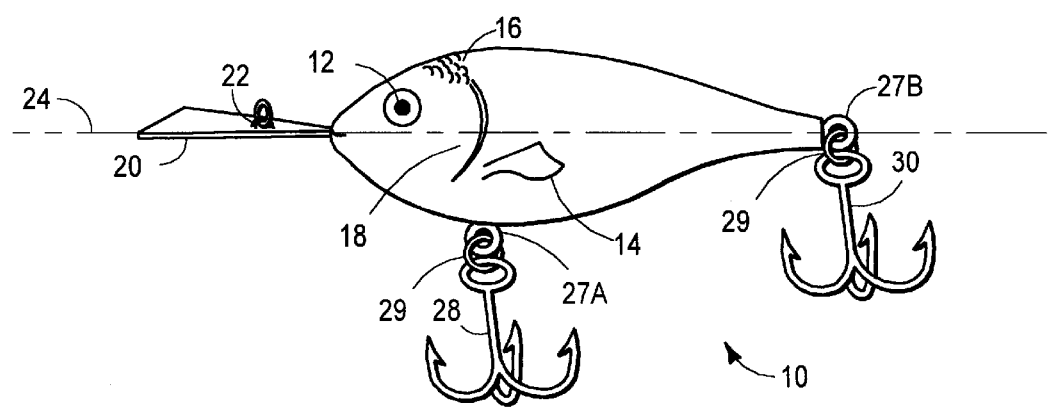
FIG. 1 is a representation of a prior art hard-bodied fishing crankbait.

Referring again to FIG. 1, treble hooks 28 and 30 are attached to the body of crankbait 10 at one and preferably two or more hook attachment points. Hook 28 is typically attached to a loop 27A that protrudes from the belly of crankbait 10 while hook 30 is typically attached to a rear protruding loop 27B or to a hole (not shown) positioned proximate to the rear of the crankbait. If crankbait 10 is of sufficient size, an additional hook attachment point (not shown) may also be provided in the body portion of crankbait 10 midway between loops 27A and 27B. Split rings 29 are commonly used to couple hooks to the protruding loops. Alternatively, treble hooks with an open shank (not shown) may be pressed over loops 27A and 27B without split rings 29. Although the length of treble hooks will vary depending on the size of fish an angler anticipates catching as well as the size of crankbait 10, treble hooks 28 and 30, in one representative example, extend from crankbait 10 by about 2.54 cm (one inch).

Figure 2A:
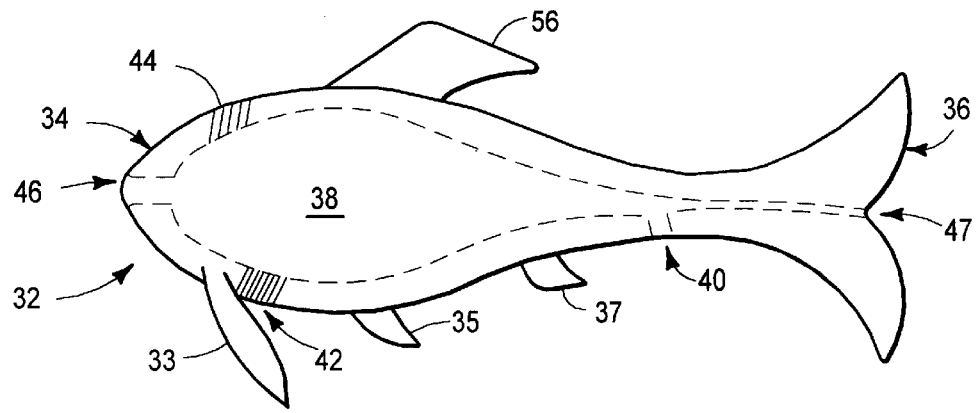
FIG. 2A is a side view of a preferred embodiment of the protective jacket of the present invention.
Figure 2B:
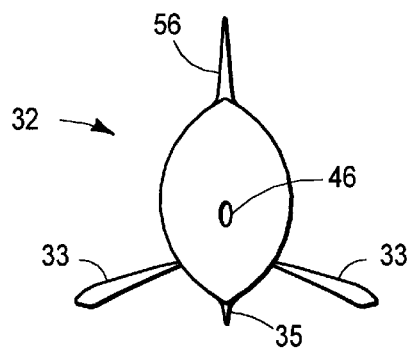
FIG. 2B is a front view of the embodiment shown in FIG. 2A.

Referring now to FIGS. 2A and 2B, a protective cover or jacket 32 of the present invention is shown having a head portion 34, a tail portion which may include a caudal fin 36, pectoral fins 33, a dorsal fin 35 and pelvic and anal fins 35 and 37, respectively, or other features that creates a realistic replica of a bait fish.

Figure 3:
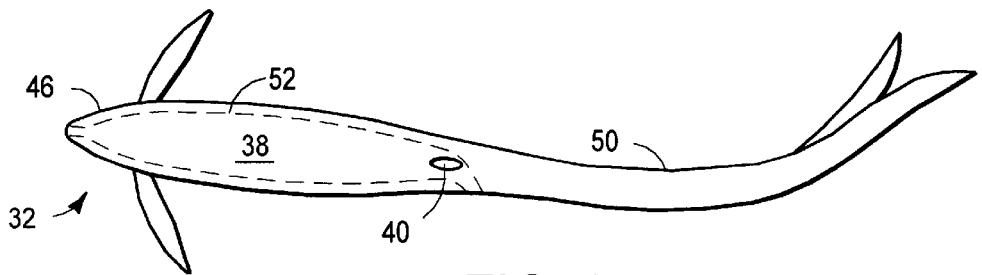
FIG. 3 is a bottom view of the protective jacket of the present invention.

As shown in FIG. 3, jacket 32 also includes a cavity 38. Tail portion 36 may be molded into a desired shape such as a fish tail, a streamer or other selected shape and undulates as the crankbait is trolled through the water. It is possible to embed capsules with steel weights, or other similar material (not shown) in tail portion 36 or cavity 38 to add weight or to create noise as the crankbait is trolled through the water.

Figure 4A:
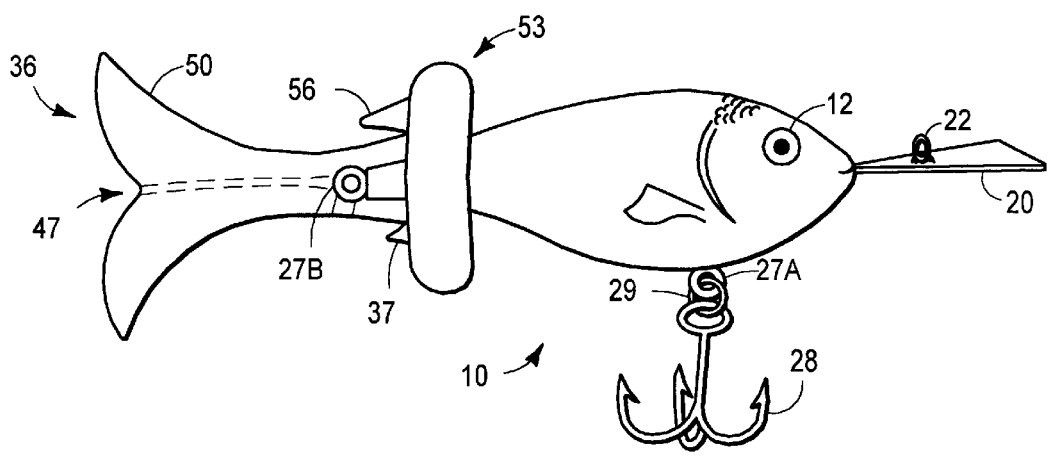
FIGS. 4A and 4B are illustrative representations of a method of applying the protective jacket of the present invention over a crankbait.

Opening 46 provides access into cavity 38 as is shown more clearly in FIG. 4A and crankbait 10 is inserted "rear first" into cavity 38 through opening 46. Opening 46 has a dimension that is significantly smaller than crankbait 10 but is stretchable to permit crankbaits of different sizes to be insert or removed from cavity 38. In one example, the diameter of opening 46 is preferably less than approximately 0.3175 cm (0.125 inches) through which a small crankbait with a length of about 5.08 cm (2 inches) and a maximum girth 6.35 cm (2.5 inches) may be inserted. In general, the dimension of opening 46 is elastically deformable and need only be large enough to dilate sufficiently to permit insertion of the crankbait, and optionally the attached treble hook 28, into cavity 38 yet sufficiently small so that after insertion of the crankbait into cavity 38 jacket 32 is able to conform around the rear portion of the crankbait. A larger opening may be desirable for jackets designed for larger crankbaits to prevent microtearing of the material in the vicinity of opening 46.

Slits 40, 42 and 44 (see FIG. 2A) are preferably narrow openings such that, in the unstretched state, opposing edges substantially remain in contact. Slits 40, 42 and 44 may be made using a pair of scissors, a knife or stretching the jacket over an attachment loop until an opening is created or formed during the molding process.

In the preferred embodiment, hooks 28 and 30 are removed before crankbait 10 is positioned in cavity 38 and then reattached to the crankbait after the jacket envelops crankbait 10. Once crankbait 10 is positioned within cavity 38, hook 28 extends outward from jacket 32 through slit 42 and hook 30 extends through slit 40. If a particular crankbait has a fishing line attachment loop positioned near the top of the head portion, the attachment loop will protrude through slit 44. Once crankbait 10 is inserted into cavity 38, jacket 32 clingly conforms to the surface of crankbait 10 and openings 40 and 46 and slits 42–44 attempt to return their unstretched dimensions thereby creating a tight fit around protruding elements of crankbait 10. The tight fit and the adherence of jacket 32 to crankbait 10 substantially eliminates ballooning or separation: of jacket 32 from crankbait 10 when trolling or casting the jacketed crankbait.

In another preferred embodiment, slit 40 has a diameter of about 0.3175 cm (0.125 inches). To ensure adequate strength in the region surrounding opening 46, the thickness of material may be increased by between 2% to 25%. The elasticity of the material comprising jacket 32 is thus believed to be sufficient to dilate during insertion of crankbait 10 and return, or attempt to its original dimensions in order to form a tight seal around diving bill 20. When crankbait 10 is inserted through slit 40 it is important that the seal around the front of crankbait 10 is as tight as possible so as to reduce the possibility that cavity 38 will fill with water and cause jacket to separate from the surface of crankbait 10 as it is retrieved. Opening 46 and slit 40 are elastically deformable such that diving bill 20 may be inserted therethrough without tearing or permanent deformation even if diving bill 20 is wide relative to the diameter of opening 46.

In one preferred embodiment of the present invention, a durable synthetic flesh-like material is castable in a variety of shapes to form jacket 32. The material is preferably a transparent hot melt adhesive material, product numbers HL-2249-X and HL-2502-X, obtained from H. B. Fuller Company of St. Paul, Minn. and marketed under the name of Full Flesh. Although the material is considered experimental by the manufacturer, HL-2249-X is a very soft, clear to amber rubber material with a tacky texture and a high degree of elasticity. The material has high elongation and tensile strength and excellent shape retention after extreme deformation. It has a Molten Gardner color of 1.5 and viscosity of 68,000 cP (mPa.s) at 325° F. (162.8° C.); 18,500 cP (mPa.s) at 350° F. (176.7° C.); 3,000 cP (mPa.s) at 375° F. (190.6° C.); and 625 cP (mPa.s) at 400° F. (204.4° C.). The recommended application temperature for HL-2249-X is in the range of 350° F. (176.7° C.) to 375° F. (190.6° C.). Higher application temperatures may tend to burn the material and cause a loss of clarity. HL-2502 is a stiffer rubber compound that has a less tacky surface. Although HL-2449-X is suitable, and indeed preferable for construction of jacket 32 due to the suppleness of the resulting jacket, it is possible to mix HL-2449-X and HL-2502-X in various proportions to achieve a compound having intermediate stiffness and tackiness properties. A powder, such as baby powder or flour, may be applied in small quantities to the exterior of jacket 32 to reduce surface tackiness and promote ease of application of jacket 32 over crankbait 10. Alternatively, jacket 32 may be dipped in a bath to coat the outside of jacket 32 and/or the inside of cavity 38 with a tackfree polyethylene wax. The wax is applied by first dispersing the wax in water and then dipping jacket 32 into the bath. The wax may be injected or sprayed into cavity 38 to coat the internal surface of cavity 38.

In another preferred embodiment, jacket 32 is molded from a soft silicon based material that is injectable using high volume injection molding equipment. The material must have a soft pliable composition and must have sufficient degree of elasticity to stretch over a crankbait. It is believed that one such material, is available from Reedy International in Keyport, N.J. (telephone number (201) 264-1777).

Figure 5:
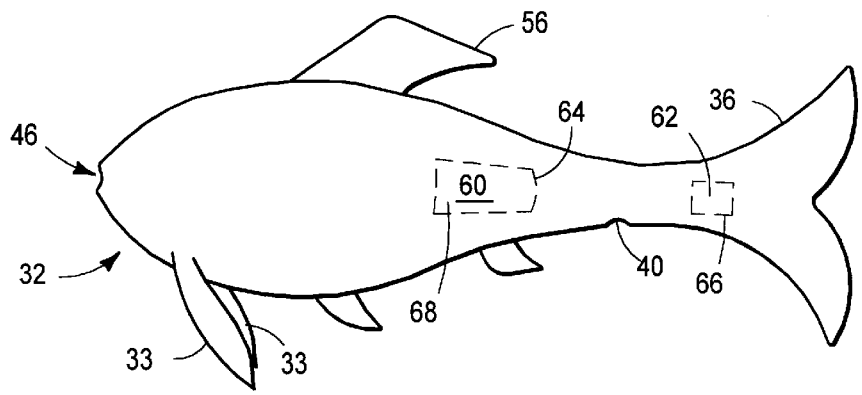
FIG. 5 is a side view of another preferred embodiment of the protective jacket of the present invention.

Due to flexibility afforded by the material and molding techniques, it is possible to add protruding elements in the form of fins 56 and 58, such as shown in FIG. 5, or other decorative features such as a long streaming tail 50 such as shown in FIG. 3. The material is castable into a variety of shapes using, by way of example, a two- or three-piece, non-porous, heat resistant, high temperature mold as is well understood by those skilled in the art. The molds may be made from metal, aluminum or from fiber glass using material available from Fiber Resin Corporation of Burbank, Calif. A three piece mold, also referred to as a matrix mold, is used when elements protruding from the base of jacket 10 make it otherwise difficult to pull a two-piece mold apart. For the sake of conciseness, further description of the construction of such molds will be omitted.

The mold pieces are put together around a core element and injected with the material. It should be noted that care must be taken to prevent incursion of moisture during the molding process to minimize bubbling of the material or explosive vaporization of the water upon application of the material.

The core element (not shown) defines the dimension of cavity 38 and the thickness of the jacket as well as the dimensions of openings 46 and 47. The core element is supported in the mold by projecting rods that define opening 46 and tail opening 47. After the material has cooled and solidified, jacket 32 is removed from the mold and the core removed from jacket 32. Any resulting mold seams or burrs on jacket 32 may be removed using a sharp knife or a heated iron.

Jacket 32 is elastically stretchable such that it may cover either a small crankbait or a large crankbait. For example, an early prototype of jacket 32 was initially constructed for a crankbait having a length of about 4.45 cm but applied to a crankbait having a length of about 13.34 cm (5.25 inches). The longer crankbait also had a maximum girth of about 8.25 cm. (3.25 inches) which was about twice as large as the original crankbait. Jacket 32 was then removed and subsequently reapplied to the original small crankbait. Regardless of the crankbait to which jacket 32 was applied, no ballooning was observed during multiple casting and underwater retrievals. However, if jacket 32 is unduly stretched by, for example, a factor of five or more, microtearing of jacket 32 may change the coloration such that jacket 32 appears more translucent. Accordingly, to prevent jacket 32 from turning translucent, the angler may need to take some degree of care to match jacket 32 with appropriately sized crankbaits.

In one preferred embodiment of the present invention, jacket 32 is either substantially clear in appearance such that the original coloration of crankbait 10 is visible with little or no distortion or a transparent amber in appearance that tends to impart an amber hue to brightly colored crankbaits. Metallic particles or bright reflective crystals may be added to all or a portion (such as to the top) of jacket 32 so as to add additional sparkle to the original coloration of crankbait 10. In yet another preferred embodiment, a dye or pigmentation is added to jacket 32 to produce a coloration independent from the coloration of crankbait 10. In this manner, jacket 32 may quickly and inexpensively change the coloration of crankbait 10 to match that of a desired bait fish without requiring the angler to buy multiple crankbaits that differ only in coloration.

Figure 4B:
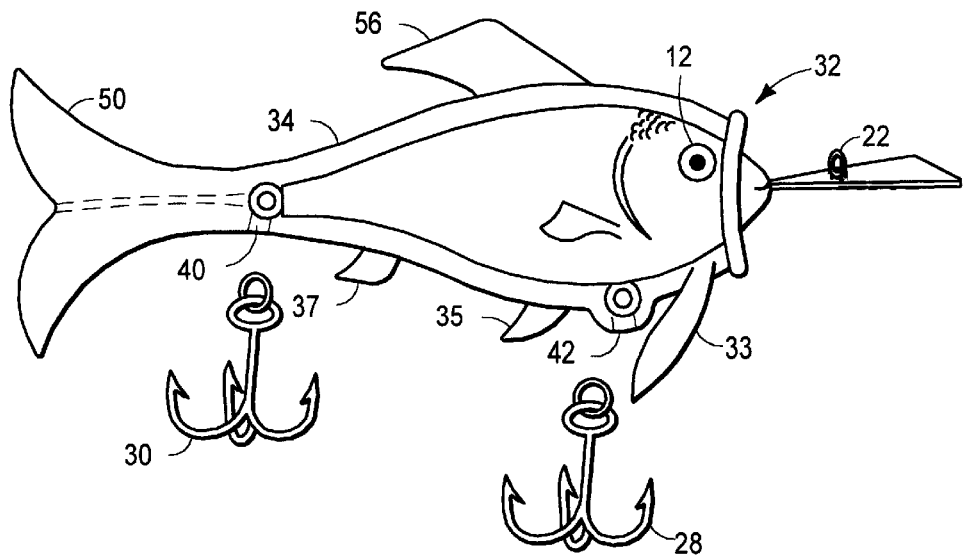

Referring now to FIGS. 4A and 4B, a preferred method for inserting crankbait 10 into cavity 38 of jacket 32 is represented. Initially, jacket is rolled into a minimized configuration such as is indicated at 53 in FIG. 4A.

Specifically, starting from opening 46, jacket 32 is rolled toward the tail portion 36 and the rear of crankbait 10 is inserted through opening 46. If necessary, opening 46 is elastically stretched to accommodate a range of diving bills from deep diving crankbaits to shallow diving crankbaits. As jacket 32 is unrolled along crankbait 10, opening 46 attempts to resume its original dimensions thereby causing a tight conforming fit of jacket 32 along the junction of diving bill 20 and the head portion of crankbait 10. If crankbait 10 has projections, jacket 32 is flexible enough to stretch over and substantially conforms to such projections. When the unrolling of jacket 32 reaches the proximity of hook 28, jacket 32 and opening 46 are stretchable so as to encompass the combined girth of crankbait 10 and hook 28. Since hook 28 is rotatably coupled to crankbait 10 at loop 27A, it is possible to minimize the combined girth by rotating hook 28 until its length is substantially parallel to longitudinal axis 24 (see FIG. 1). However, it is preferable that hooks 28 and 30 are removed before crankbait 10 is inserted and later re-attached.

The unrolling of jacket 32 continues, as shown more clearly in FIG. 4B, until slit 42 is proximate to loop 27A. By dilating slit 42, that is, by locally stretching jacket 32, it is possible to insert loop 27A through slit 42. Once passed through slit 42, the local stretching force is no longer be applied and slit 42 substantially resumes its original dimensions again providing a tight conforming fit around loop 27A. Jacket 32 is furthered unrolled until diving bill 20 protrudes from opening 46. The position of jacket 32 may need to be adjusted until the dorsal fin is centered over the longitudinal centerline of crankbait 10.

In an alternative preferred method for applying jacket 32 (not shown), opening 46 has a diameter of about 0.3175 cm (0.125 inches) and crankbait 10 is inserted "head first" into cavity 38 through slit 40, which preferably has wider dimensions than slits 42 and 44, rather than opening 46. Specifically, slit 40 is dilated to provide access to the cavity 38 while rolling the jacket into a minimized configuration. Dilation is obtained by stretching the jacket 32 in the region surrounding the opening until opening 40 is large enough to insert the crankbait into the cavity. The head of crankbait is then positioned in the cavity of the jacket with diving bill 20 projecting from opening 46 and the stretched jacket is unrolled over crankbait 10 and allowed to conform to the crankbait 10. The position of jacket 32 may need to be adjusted until the dorsal fin is centered on the longitudinal centerline of crankbait 10.

Figure 4C:
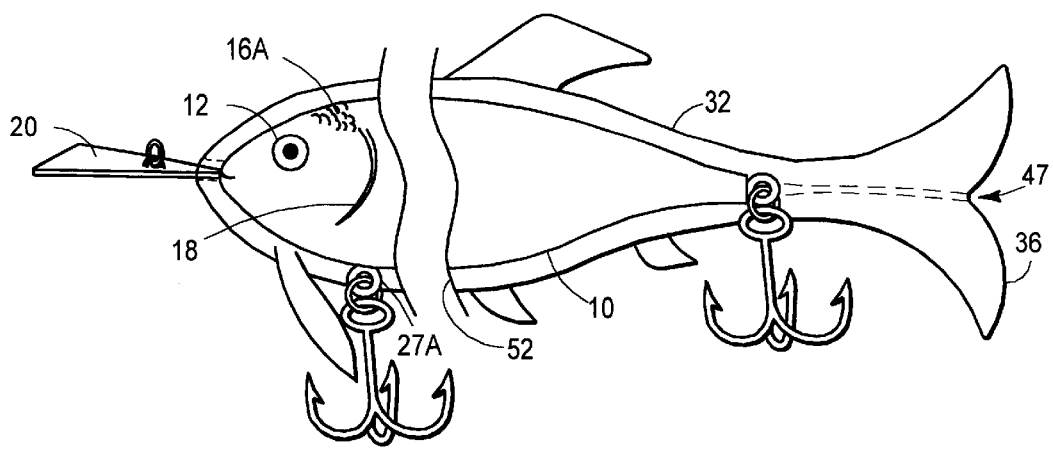

Once applied to crankbait 10, jacket 32 substantially conforms to the shape of crankbait 10 as is more clearly shown in FIG. 4C. Further, if jacket 32 has a trailing tail portion 36 or 50 (see FIGS. 2 and 3) or similar feature, the crankbait 10 appears as a larger bait. If no such tail is present, the size of crankbait 10 is substantially unchanged with the application of jacket 32 although the texture is more flesh-like with jacket 32 applied. Depending on the color or decorative features of jacket 32, the coloration and texture of crankbait 10 may be easily changed. Additional life-like features, such as scales 16A, may be readily added.

As generally indicated by reference numeral 56, jacket 32 has a certain thickness associated therewith. With the preferred material, the thickness associated with jacket 10 provides realistic compression and elongation. Thus, when a fish strikes at the crankbait, the crankbait presents a life-like texture to crankbait 10 rather than the hard unnatural texture of a wood, plastic or metal crankbait. Due to the elastic tendency of the preferred material, jacket 32 substantially adheres to crankbait 10 so there is little separation between jacket 32 and crankbait 10 even if the crankbait has multiple protrusions. Also, since the preferred material is durable and tear resistant, jacket 32 resists repeated strikes by fish without tearing and returns to its original shape despite repeated applications onto or removal from different sized crankbaits.

As indicated at 52 (by the dashed line) in FIG. 3 and in FIG. 4C, the thickness of jacket 32 in the head and body portions is preferably a membrane of between 20.32 mm (0.08 inches) and 63.5 mm (0.25 inches) that provide flesh-like compression once it is applied to a crankbait. It being understood that such thickness is not shown to scale in FIGS. 3 and 4C. Preferably, the membrane thickness of jacket 32 will be at least 31.75 mm (0.125 inches) in the body portion and thicker than 31.75 mm in the head portion 34 around opening 46. It will be appreciated by one skilled in the art that the actual thickness when applied on crankbait 10 may vary depending on the relative size of crankbait 10 and cavity 38 and protrusions, if any, (on crankbait 10). However, thicker head and body portions of jacket 32 are expected to be more durable and capable of being stretched over a wider variety of differently sized crankbaits without incurring excessive microtearing, ballooning when applied to crankbait 10 and trolled through the water or inducing a partially opaque appearance to an otherwise transparent jacket 32. Tail portion 36 of jacket 32 is preferably a substantially solid extension having a girth of about 3.175 cm (1.25 inches). It is believed that tail portion 36 should comprise about 40% to 60% of the overall length of jacket 32 in the unstretched state. Specifically, tail portion 36 may have a length of between 2.54 cm to 4.45 cm (1.0 to 1.75 inches) with a preferred length of about 3.05 cm (1.3 inches) for a jacket having an overall length of about 6 cm (2.4 inches). When applied to a crankbait, tail portion 36 will comprise about one third of the overall length of jacket 32 when stretched to an overall length of about 9.9 cm (3.9 inches). Longer, thinner tail portions 50, such as shown in FIG. 3, are also contemplated and may comprise about 50% of the overall length of jacket 32 when stretched onto a crankbait body.

Referring now to FIG. 5, another preferred embodiment of jacket 32 is shown. In this embodiment, jacket 32 has dorsal fin 56 and fins 33 extending outward from jacket 32. One skilled in the art shall further appreciate that added features may include additional fins or other protrusions. Preferably, dorsal fin 56 and fins 33 are integrally molded into jacket 32 during the manufacturing process and are comprised of the preferred jacket material made as thin as possible (that is, preferably less than 31.75 mm) so as to present a life-like appearance as the crankbait is alternately moved through or suspended in the water. Specifically, when the jacketed crankbait is allowed to float in the water, the protruding fins will flutter outward giving the appearance of a suspending fish but will fold back against the crankbait as it is retrieved. Dorsal fin 56 may include a stiffning ridge (not shown) along the forward edge to ensure that the fin protruds away from crankbait 10 but will also flutter when allowed to float in water.

Also shown in the embodiment illustrated in FIG. 5 are cavities or pockets 60 and 62. Pockets 60 and 62 comprise voids formed in jacket 32 into which the angler may insert fish attractant such as blood, fish or other bait parts or solid matter such as commercial fish food. Slits 64 and 66 provide access to pockets 60 and 62, respectively, so that the attractant can be easily inserted. Due to the adhesive and elastic nature of the preferred material comprising jacket 32, slits 64 and 66 are sealed by applying pressure to the slits.

In yet another embodiment, pockets 60 and 62 have a very thin or blister-like membrane (not shown) such that when a fish strikes the jacketed crankbait, the blister-like membrane is easily punctured thereby releasing a large amount of fish attractant in a very short period from pocket 60 and or pocket 62. Alternatively, attractant may be inserted into cavity 38 behind crankbait 10 or absorbed into jacket 32 directly by submersing jacket 32 into an attractant oil or solution. The attractant is absorbed into the synthetic flesh-like material due to the porous nature of the material. Advantageously, tail opening 47 (FIG. 3) provides a passage for scent attractant positioned in cavity 38 to be expressed out through tail 36 as crankbait 10 is moved through the water. It is anticipated that such a quick release of an attractant such as blood, will encourage the fish to strike the crankbait again thereby permitting the angler to readily hook the fish. It will be understood by one skilled in the art that using the matrix molding technique described above, the cavity that the jacketed crankbait could continually release a fish attractant and when hit by a fish, release a large amount of attractant from blister pockets 60 and 62 to further attract strikes by the fish.

Figure 6:
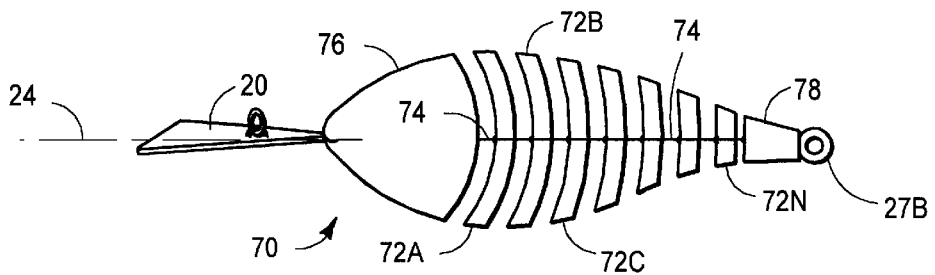
FIG. 6 is a side view of a segmented crankbait to which the protective jacket is applied in yet another preferred embodiment of the present invention.
Figure 7:
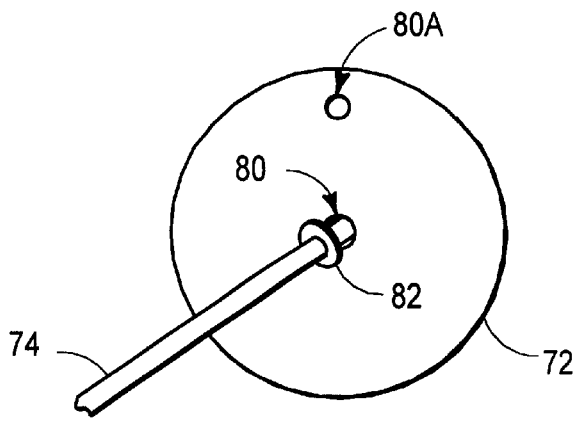
FIG. 7 is a front view of one segment of the crankbait shown in FIG. 6.

Referring now to FIGS. 6 and 7, a segmented crankbait 70 is shown having a plurality of segments 72 coupled together by a flexible wire rope or plastic impregnated string 74 and substantially symmetrically aligned along longitudinal axis 24. Segment 72A is coupled to a head portion 76 at one end of crankbait 70 while segment 72n is coupled to tail portion 78 at a second end. The diameter of each segment 72 is generally equal to or smaller than the preceding segment when proceeding from the head end to the tail end of crankbait 70. Specifically, the diameter of segment 72A is substantially equal to or larger than the diameter of segment 72B which, in turn, is larger than the diameter of segment 72C. Segment 72C is larger than segment 72D and so on to segment 72n so that the overall effect is that segmented crankbait 70 has a shape substantially similar to a solid crankbait. The forward facing surface of each segment 72 may be slightly concave while the rear surface may be convex. Alternatively, each segment 72 comprises a disk with parallel forward and rear surfaces.

As shown in FIG. 7, each segment 72 has a center hole 80 through which the wire rope or string 74 may pass. Between each segment, a spacer 82 having a diameter larger than center hole 80, is inserted to prevent relative movement of each segment along rope or string 74. One skilled in the art will appreciate that spacers 82 may comprise items such as washers, knots, beads or additional segments. The rope or string 74 is terminated at each end in a knot or other retention means such as a staple so that the segments 72 are permanently retained on the rope or string 74. Hook and line attachment loops, weights, for example weighted tape, and diving bills may be attached to one or more of the segments 72. Jacket 32 is applied over segmented crankbait 70 in the manner described above in conjunction with FIGS. 4A–4C. Movement of segmented crankbait 70 when trolled or reeled toward the rod is enhanced if jacket 32 has a tail portion 36 or 50 such as is shown in FIG. 2 or FIG. 3.

In yet another embodiment, the material completely surrounds each segment 72 such that segmented crankbait 70 is fully and permanently embedded in the material. In this embodiment, segmented crankbait 70 provides the structural support for mounting the hooks and for attaching to crankbait to the fishing line while the material presents a realistic "feel" to the fish. In one preferred method, segmented crankbait 70 is dipped into a vat of liquid synthetic material heated to approximately 350° (176.5° C.) until the material substantially fills in the area between segments and a desired thickness of the material is obtained over the circumference of segmented crankbait 70. In this preferred embodiment, the coated segmented crankbait will have a substantially cylindrical shape with the hooks and line attachment loops projecting therefrom.

Alternatively, segmented crankbait 70 may be positioned in the mold in place of the core so that realistic fins, tails and/or scales may be added to the crankbait. Preferably, a removable skewer is inserted through a second hole 80A in each segment to ensure proper positioning in the mold. After the material is injected into the mold, segmented crankbait 70 is removed from the mold and the skewer is extracted. The skewer comprises a thin metal rod of sufficient length such that, when inserted through segmented crankbait 70 and placed in the mold, it is supported at its end portions by the mold. Also, since the external geometry of the segmented crankbait 70 is defined by the mold, segments 72 may have substantially uniform dimensions and may also be any desired shape, such as, by way of example, a rectangular cube, elongated rod, circular disk or combinations thereof. Further, the number of segments may be limited to a head segment 76 and a tail segment 78.

Figure 8:
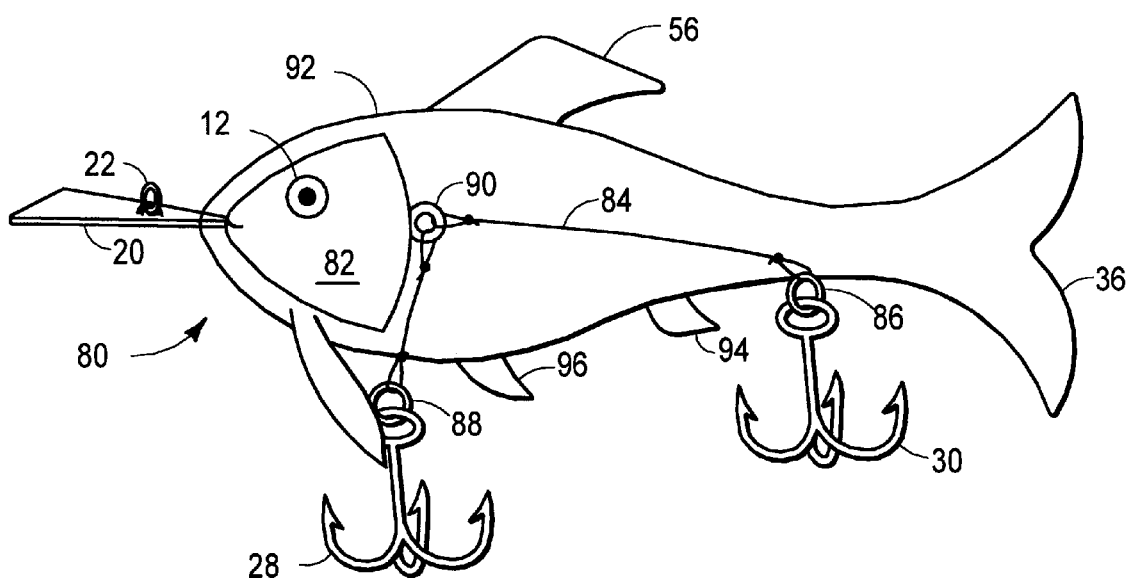
FIG. 8 is a side view of another embodiment of the present invention.

Referring now to FIG. 8, another preferred embodiment of the present invention is illustrated. Specifically, lure 80 comprises a plug or skull cap 82 which is placed into a mold and embedded in a substantially solid fish-shaped body. Skull cap 82 may have a fishing line attachment loop 22 and diving bill 20 directly attached thereto. A thin wire cable or rope 84, which terminates in a hook attachment loop 86 that protrudes near the tail portion 36 of the lure 80, is threaded to skull cap and eye loop 90. A second hook attachment loop 88 protrudes below the belly of the lure body proximate to skull cap 82. Loop 88 is attached to rope 84 and maintained in place by eye loop 90. Skull cap 82 is embedded in the flesh-like material such that a layer of material covers the skull cap 82 as indicated at 92.

As with the other preferred embodiments, discussed above, realistic tail portion 36, including a caudal fin, decorative tail 50, dorsal fin 56, anal fin 94, pelvic fin 96 and/or pectoral fins (not shown) may be molded into the body of lure 80. The protruding fins and tail portion are made as thin as possible (that is, preferably less than 31.75 mm) so as to present a life-like appearance as the crankbait is alternately moved through or suspended in the water. Specifically, when lure 80 is allowed to float in the water, the protruding fins will flutter outward giving the appearance of a suspending fish but will fold backwards as lure 80 is retrieved.

Figure 9:
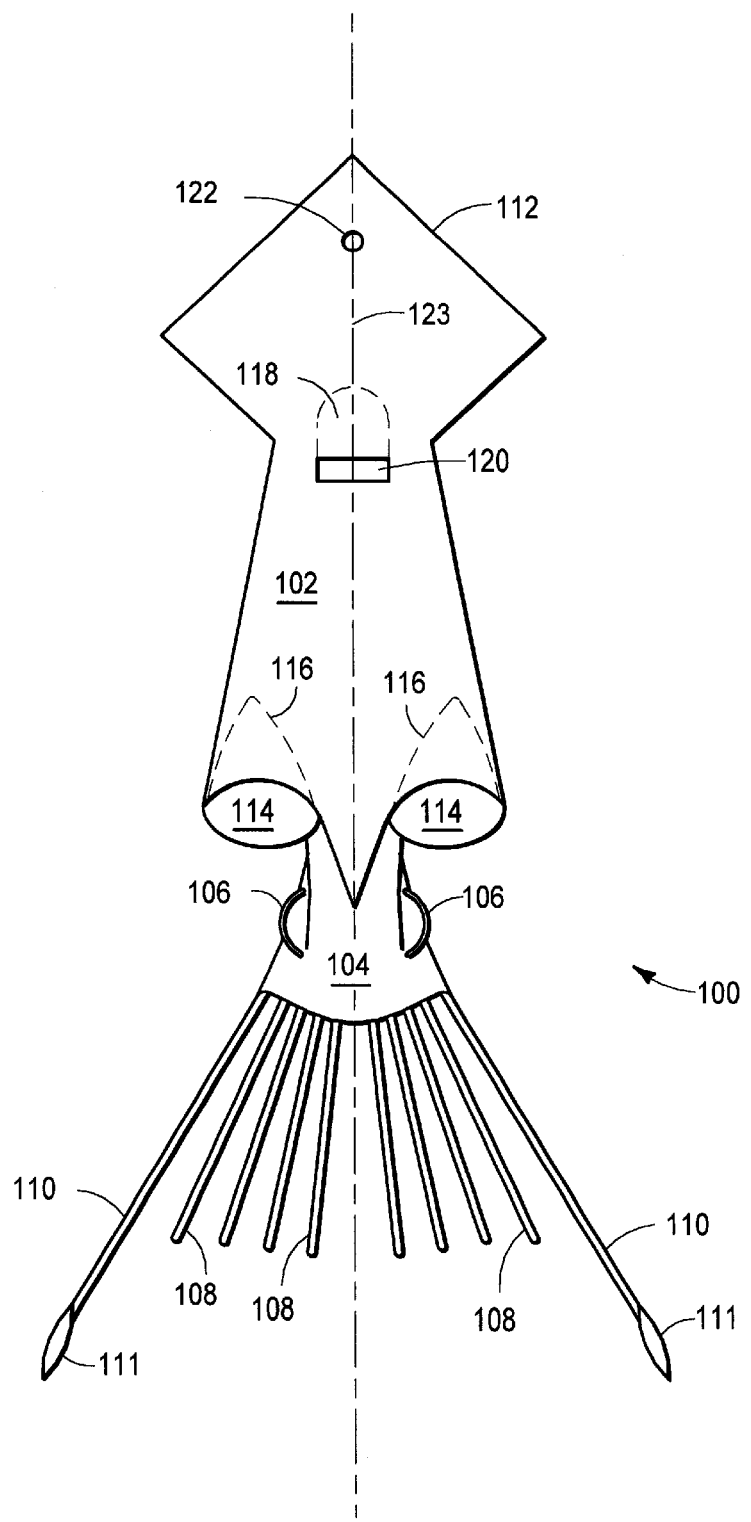
FIG. 9 illustrates another preferred embodiment of the present invention.

Referring now to FIG. 9, an alternative embodiment is shown. A jacket is shown molded in the configuration of a squid 100. Squid 100 includes a body 102 having a basic cigar-shape and a head 104. A plurality of tentacles 108 and 110 radiates outward from head 104. As shown, there are eight relatively short tentacles 108 and two longer tentacles 110. Each tentacle 110 terminates in a widened paddle 111. In the preferred embodiment, tentacles 110 are slightly longer than tentacles 108 and all tentacles 108 and 110 radiate or splay from head 104 on a common plane. Head 104 also includes two side protrusions 106 that mimic the eyes of a common squid.

Body 102 is a substantially solid conical or cigar-shaped body segment terminating in a flattened triangular shaped tail 112. At the end of body 102, proximate to the head 104, a pair of cavities 114 extends inward into body 102 to mimic breathing vents of a natural squid. Cavities 114 are defined by dotted lines 116. Body 102 further includes a cavity 118 positioned along a midline 123 or longitudinal axis of body 102 proximate to tail 112. By way of example, if the body and head of squid 100 have a combined length of about five and one half inches, the center of cavity 118 will be approximately 5.0 centimeters (about 2 inches) from the tip of tail 112. A hole 122 is positioned proximate to the tip of tail 112, preferably along midline 123. As shown, mid-line 123 runs from the tip of tail 112 through hole 122 and cavity 118 approximately bisecting body 102.

In one preferred embodiment of squid 100, the durable synthetic flesh-like material used in the previous jacket 32 embodiment is also used to mold the present squid. Advantageously, with the high degree of elasticity, tentacles 108 and 110 as well as body 102 and tail 112 are able to withstand repeated strikes by salt water predator fish without tearing or substantial shredding, a common problem with lures made from plastisol. Further, as discussed more fully below, a hook-supporting element may be readily inserted and retained in cavity 118 in a manner similar to that described in the previous embodiments of jacket 32.

Figure 10A:
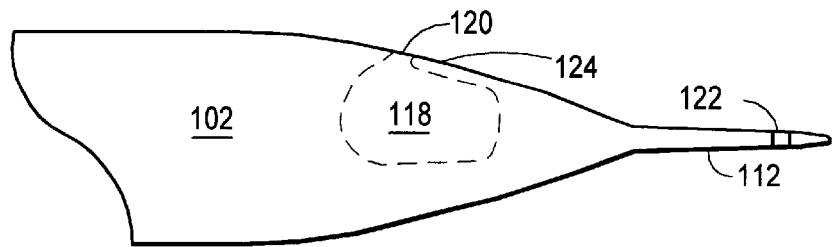
FIGS. 10A and 10B are cut-away side views of the body portion and the tail portion of the embodiment shown in FIG. 9.

FIG. 10A shows a side cut-away view of body 102. Cavity 118 is shown extending underneath a substantially investing cover 124 towards tail 112. Access to cavity is through opening 120. It is preferred that opening 120 be as small as possible. As shown in FIG. 10A, cover 124 covers and substantially encloses cavity 118. In one preferred embodiment, cover 124 is relatively thin when compared to the solid body region underlying cavity 118.

Figure 10B:
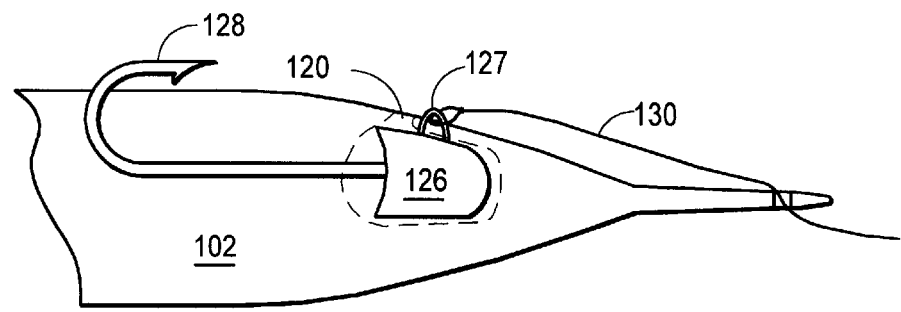

Cover 124 provides a retaining function such that when lead head 126 is inserted into cavity 118 through opening 120 a substantial portion of the lead head opposite the hook will be securely retained in cavity 118. This relationship is shown more clearly in FIG. 10B. With the preferred flesh-like material, an additional slit in cover 124 permits loop 127 of the lead head 126 to protrude through cover 124. Lead head 126 includes an integral fish hook 128 at the end of a shank. By forcing the hook through the solid body 102 the barbed end portion of the hook will exit body 102 at a point between cavity 118 and head 104 with the shank embedded in the solid body portion. Alternatively, cavity 118 may include a scent tube (not shown but see tail opening 47 in FIG. 2) that extends from cavity 118 through head 104 so that a wire leader may be attached to the lead head at one end and to at least one hook or a treble hook at the other end. In this manner, a trailing hook may be readily adapted to the follow the squid as it is trolled through the water. Further, any scent placed in cavity 118 may be dispersed through the scent tube as the squid is trolled through the water.

Loop 127 protruding through cover 124 provides an attachment point for fishing line 130. Fishing line 130 is threaded through hole 122, as illustrated in an exaggerated manner in FIG. 10B. With fishing line 130 attached in this manner, tail 112 is supported in a position defined by fishing line 130 when tension is applied. Such support prevents the tail from folding back toward head 104 when squid 100 is trolled through the water. As squid 100 is allowed to sink under the weight of lead head 126, the natural buoyancy of head 104 will tend to float toward the surface. Also, since the upwardly extending fishing line 130 supports tail 112, squid 100 will have a tendency to resist the downward motion provided from lead head 126. Accordingly, the squid tends to assume a horizontal position during a controlled descent. Further, as the tail presents outwardly extending and flexible planes, squid 100 presents a wobbling generally downward path more attractive to bait fish rather than a substantially straight descent. Further still, since lead head 126 is positioned in cavity 118 more closely proximate to tail portion, tentacles 108 and 110 will tend to splay and float upward relative to lead head 126. Whenever the downward motion provided by lead head 126 is interrupted, either by retrieving fishing line 130 or by wave action increasing the tension on fishing line 130, the tentacles will tend to group themselves in a tight configuration such that the paddle of each tentacle is substantially parallel to midline 123. As the downward motion is allowed to resume, tentacles 108 and 110 will again tend to splay outward in a fluttering, undulating manner. Once the squid 100 reaches a steady state depth, it has a tendency to assume a substantially horizontal plane similar to a natural squid rather than floating in a vertical manner by maintaining a small degree of tension on the fishing line 130.

Figure 11:
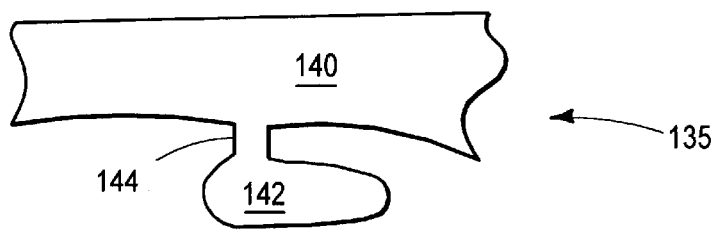
FIG. 11 shows a portion of a mold useful for creating the cavity shown in FIG. 9.

Referring now to FIG. 11, a portion of a mold 135 for manufacturing squid 100 is shown. Mold 135 includes a top portion 140 that defines the top half of squid 100. Top portion 140 further includes a protruding element 142 that defines cavity 118 and cover 124. A portion 144 couples protruding element 142 to top portion 140. The length of portion 144 determines the thickness of cover 124. In this manner, a cavity 118 and cover 124 are readily formed in conjunction with the molding of squid 100 using a two-piece mold. Although not shown, it is possible to use the removable core element described above in conjunction with the casting of jacket 32 to define the dimensions of cavity 118 with mold 135. In this manner a scent tube provides a passageway from cavity 118 through head 104 to disperse scent disposed in cavity 118. Advantageously, as the predator fish attacks squid 100, compression of the flesh-like material will cause scent to be dispersed or vented through the scent tube.

Squid 100 is molded using well-known molding equipment. Prior to molding squid 100, attractants, such as a fluorescent powder, glow-in-the-dark powder, crystal reflective material, metal flakes, natural attractants such as cricket legs or corn meal, pigmentation powder or other liquid or solid substances, may be added to the flesh-like material before the material solidifies. These attractants become intrinsically embedded in the flesh-like material during the molding process. Alternatively, the attractants may be dispersed on the mold surface prior to injection. To hold the attractant along the mold surface, the mold surface may be dampened with water or other appropriate mold release agents. Upon injection of the material, the attractant is embedded in the surface layer of the flesh-like material upon solidification.

Using the alternative method, attractant, such as metal flakes, fluorescent powder or glow-in-the dark powder, is concentrated near the outer surface layer of squid 100. In this manner, the metal flakes provide reflective flashes of light to attract the attention of the predator fish when suspended near the surface of the water. When suspended at depths where external natural light is unavailable, the light emitting glow of the fluorescent or glow-in-the dark powder provide an alternative method by which predator fish may otherwise locate the bait. As with jacket 32, once the predator fish engages squid 100, the natural attractants will tend to hold the bite longer since to the flesh-like material feels like natural prey. Further, by soaking squid 100 in scented oil, such as squid oil or other oil-based attractant solution, squid 100 will absorb the scent that will be slowly dispersed while in the water or when compressed by a biting predator fish. In this manner, the present invention provides the appearance and feel as well as the smell and taste of a natural squid.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. It is intended that the scope of the invention be limited not by this detailed description but by the claims appended hereto.

I claim:

1. A fishing lure comprising:

means for coupling at least one fish hook to a fishing line, said coupling means having a plurality of attachment loops; and a flesh-like jacket having a cavity defined by a membrane and an aperture for inserting said coupling means into said cavity such that when said coupling means is inserted into said cavity, said membrane envelops said coupling means and the inner surface of said membrane conformably adheres to said coupling means, said membrane having a plurality of slits for exposing said attachment loops, each of said plurality of slits positionable with respect to and conforming to a corresponding one of said plurality of attachment loops; said jacket further including a portion projecting along said longitudinal axis away from said fishing line, said portion being substantially solid in cross-section and having a girth; said portion terminating in a flattened tail fin, said portion having a vent tube extending from said cavity to said tail fin along said longitudinal axis.

2. The fishing lure of claim 1 wherein said cavity defining membrane of said jacket further comprises a first region having a first thickness and a second region surrounding said aperture having a second thickness.

3. The fishing lure of claim 1 wherein said jacket further comprises at least one outwardly projecting fin parallel to said longitudinal axis and at least two outwardly projecting fins perpendicular to said longitudinal axis, said fins formed on an outer surface of said jacket.

4. The fishing lure of claim 1 further comprising a second portion extending in a direction toward said fishing line, said second portion being substantially solid in cross-section and having means for engaging said fishing line along said longitudinal axis such that a portion of said fishing line remains substantially parallel to said longitudinal axis.

5. A fishing lure comprising:

means for coupling at least one fish hook to a length of fishing line, said coupling means having a fishing hook coupled thereto and an attachment loop for attaching said fish line to said coupling means; and a compressible outer covering having:

a cavity defined at least in part by a cover, said cover at least partially retaining a forward portion of said coupling means in said cavity, said outer covering having a slit for exposing said attachment loop, said slit positionable with respect to and conforming to said attachment loop;

a tail portion extending from said cavity in a forward direction along a longitudinal axis, said tail portion having a solid cross-section and means for engaging said fishing line along said longitudinal axis forward of said coupling means in said forward direction such that a portion of said fishing line remains substantially parallel to said longitudinal axis; and a body portion extending along said longitudinal axis away from said cavity in a direction opposite from said tail portion, said body portion having a substantially solid cross-section.

6. The fishing lure of claim 5 wherein said tail portion further comprises an extension of said tail portion forward of said engaging means, said extension engaging said fishing line along said longitudinal axis forward of said coupling means to support said tail portion along said longitudinal axis when tension is applied to said fishing line.

7. The fishing lure of claim 5 wherein said covering further comprises a scent-absorbing material.

8. The fishing lure of claim 5 wherein said covering further comprises embedded attractants.

* * * * *